United States Patent [19]
Kogure

[11] 4,359,435
[45] Nov. 16, 1982

[54] METHOD FOR MANUFACTURING PLASTIC PRODUCTS

[76] Inventor: Yamato Kogure, 5821-663 Masago-cho, Niigata-shi, Niigata, Japan

[21] Appl. No.: 323,305

[22] Filed: Nov. 20, 1981

Related U.S. Application Data

[63] Continuation-in-part of Ser. No. 87,540, Oct. 23, 1979, abandoned, Ser. No. 69,270, Aug. 24, 1979, abandoned, and Ser. No. 948,675, Oct. 5, 1978, abandoned.

[30] Foreign Application Priority Data

Apr. 19, 1978 [JP] Japan .................................. 53-46048
Jun. 25, 1979 [JP] Japan .................................. 54-79945

[51] Int. Cl.³ .......................... B29C 5/00; B29F 1/08
[52] U.S. Cl. .................................. 264/40.5; 264/17; 264/40.6; 264/40.7; 264/328.16; 425/812; 425/DIG. 11
[58] Field of Search ............... 425/DIG. 11, 145, 146, 425/149, 144, 812; 249/54, 141; 264/327, 328.14, 328.15, 40.1, 40.5, 16–18, 40.7, 40.6, 328.12, 328.16

[56] References Cited

U.S. PATENT DOCUMENTS 2,669,762 2/1954 Blackburn et al. ................... 249/79
2,786,234 3/1957 Beyer ................................. 425/149
2,859,088 11/1958 Erdle et al. ........................ 249/54
3,222,725 12/1965 Smith ................................. 425/547
3,616,495 11/1971 Lemelson .......................... 425/155
3,767,340 10/1973 Driscoll et al. .................... 425/146
3,807,914 4/1974 Paulson et al. ..................... 425/144
3,859,400 1/1975 Ma ..................................... 425/145
3,932,083 1/1976 Boettner ............................ 425/145
3,976,415 8/1976 Hauser et al. ..................... 425/145
3,982,440 9/1976 Groleau et al. .................... 264/40.1
4,066,725 1/1978 Boettner ............................ 264/40.1
4,146,601 3/1979 Bishop .............................. 264/40.1

FOREIGN PATENT DOCUMENTS 51-19050 2/1976 Japan .................................. 425/549

Primary Examiner—Willard E. Hoag
Attorney, Agent, or Firm—Koda and Androlia

[57] ABSTRACT

A method of producing resin articles by use of a plaster mold in which the resin injection pressure in the plaster mold is sensed by a pressure sensing means to control the injection conditions for a molding machine in accordance with the desired injection speed, injection pressure, and holding time, as determined by the size and shape of the article being molded and the diameters of a sprue runner and an air vent. Heating and cooling pipes may optionally be embedded in the plaster to accelerate the setting of the resin in any thick portions while maintaining the resin in the sprue runner position of the mold sufficiently fluid so that additional resin may still be injected into the mold to compensate for any shrinkage. The molded products may be dental prosthetic goods of intricate shape and having increased strength and improved dimensional accuracy compared to those fabricated by previous methods.

8 Claims, 10 Drawing Figures

PRIOR ART

METHOD FOR MANUFACTURING PLASTIC PRODUCTS

CROSS-REFERENCE

This is a continuation-in-part application of a continuation-in-part application filed Oct. 23, 1979, Ser. No. 087,540 of a continuation-in-part application filed Aug. 24, 1979, Ser. No. 069,270 of an application filed Oct. 5, 1978, Ser. No. 948,675 all now abandoned.

BACKGROUND OF THE INVENTION

1. Field of the Invention

This invention relates to a method of producing, by use of a plaster mold, resin articles such as dental prosthetic goods or industrial trial articles and the products thereof.

2. Prior Art

Heretofore, the step of injecting the resin into a plaster mold during the fabrication of dental plates and other dental prosthetic goods was typically performed as a manual operation, with a relatively slow setting resin material being used in combination with a plaster mold contained in a metal flask. However, the resultant product had poor dimensional stability due to nonuniform pressure polymerization, thus making the manufacture of an article of accurate size impossible. As an alternative to such a manual operation, a conventional injection molding machine could be used with plaster molds. However, the molding process intended for use with plaster molds and that intended for use with metal molds are basically different from each other in that different injection conditions are involved. In general, injection molding is a process wherein plastic material is fed by a screw into a heated cylinder and plasticized by external mechanical energy, from solid to liquid state, charged into the mold by external kinetic energy and again changed into a solid through absorption of the energy by the mold. Thus, the process and the quality of the completed articles are greatly influenced by external molding conditions. As a result of improper injection conditions, many different types of molded products may have defects such as short shots, flashing, flow marks, jetting, weld lines, gas burning, air bubbles, clouding, cold marks, strain, warping, cavities, noncompliance to standards, intershot standard errors and inter-rod standard errors. As examples of the kinds of injection conditions involved may be enumerated: cylinder heating temperatures for plasticizing the material, screw RPM's, the amount of the material to be stored in the injection cylinder for injection into the mold, metering strokes, screw back pressures, injection pressures for charging and pressurizing into the mold, injection speed, injection time, cooling temperature for absorption of thermal energy, cooling time, etc. These conditions are critical and indispensable for producing quality molded articles. For instance, if the cylinder temperature is too high, the properties of the plastic material are lost through deterioration of the material. If the metering stroke is excessive, the resin will stay in the cylinder too long, resulting in deterioration of the material. If the injection energy is too low, the lustre proper to the resin is lost, sometimes causing cold marks. Moreover, if the cooling time is short, the molded product may be unstable in shape and warped. Thus, skilled operators were required to operate the machine, since the molded products were checked by inspection by the operators, who then had to make appropriate adjustments to the molding conditions. The molding conditions are interrelated to one another and quality defects in the molded product cannot be adjusted out unless it is known how the plastic material is affected under various conditions throughout the entire process, and what is happening in the mold.

As the molding conditions are not constant, but are changing at all times to a more or less degree, the product quality per each shot cannot be maintained easily. As a practical matter, the physical properties of the plastic material are subject to the effects of changes in hydraulic pressure, oil temperature, mold temperature and heating temperature. The molding machine must remain stable under the effect of these changes. Fluctuations or discrepancies in the product quality even in the absence of such changes may be attributable to variations in plasticizing factors, including: air discharge from the resin, material purity, mixing of regenerated articles, mixing of compound material, and viscosity of regenerated articles. These factors have been confirmed experimentally to account for a majority of fluctuations occurring in the products and these factors are extremely difficult to be placed under effective quality control.

From the above considerations, it follows that the proper amount of evenly plasticized molten resin must be accurately charged into the mold with an injection energy appropriate to the mold, and that the proper injection conditions must be accurately maintained until the sprue runner and/or gate has been sealed and the product has been cooled for the proper cooling time to the proper cooling temperature. The problem is then how to control these factors. The status functions for the plastic material comprise three parameters: resin pressure, resin capacity and resin temperature. It has been proposed to provide a sensor in the mold for sensing the resin temperature and feeding the sensed temperature back to a heating means mounted at the entrance to the gate. However, an expedient, as a practical matter, has too slow a response time, in view of the high injection speed of the resin which may be of the order of much less than one second. The resin capacity can be made constant by maintaining the mold clamping state constant. Changes in the charged quantity of resin with which the cavity is filled can be sensed indirectly through pressure increase in the resin.

Referring to FIG. 8 (which graphically illustrates a typical relationship between the mold inside pressure and time) such defects as flow marks, jetting weld lines, gas burning, bubbles, cloud, cold marks, strain and warping occur during charging (time point A in the drawing); such defects as flashing, or strain occur immediately before completion of charging (time point B); such defects as short shot, flashing, warping, cavity nonconformance to standards and intershot standard errors occur during pressure holding (time point C) and such defects as warping occurs during cooling (time point D). Thus, a majority of defects are caused during charging. Accordingly, the most important conditions for the molding of the resin is pressure.

The factors discussed above are also relevant to the molding of one-of-a-kind dental prosthetic articles, such as denture plates. However, such articles typically are complex and varying in shape, and comprise many intricate thick and thin portions; their shape is frequently such that undercuts are unavoidable in the one or two piece plaster molds normally employed, and therefore the mold must be destroyed after a single use. Accordingly, when fabricating such articles, it is not possible to make a series of test shots for the purpose of adjusting the machinery to fine tune the molding conditions, nor is it possible to make minor changes to the mold itself, such as varying size or location of a sprue or vent.

Furthermore, plaster molds are not as sturdy as metal molds, and accordingly cannot withstand the pressure extremes normally associated with modern high-speed injection methods utilized for the mass production of articles from high strength polycarbonates and other fast-setting resin materials. This is especially important in the manufacture of resin articles having both thick and thin portions, where it is desireable to use high injection speeds and high injection pressures to force the resin into the thin portion of the molds before it starts to set. Thus, even the best prior art denture plates manufactured by means of plaster molds had a minimum thickness of 1.5 mm, which is excessively thick from a physiological point of view.

Hence, it has long been desired to provide a method for the molding of resin under optimum conditions into a plaster mold, wherein the correlation among the injection speed, inside pressure of the mold and the holding pressure on the one hand and the sprue runner and gate dimensions with air vent dimensions on the other hand may be specified and controlled by appropriate technical measures, so as to result in the convenient fabrication of one-of-a-kind molded articles such as dental prosthetic goods having the desired physical properties and dimensional stability that are associated with modern resin materials.

SUMMARY OF THE INVENTION

This invention relates to a method and apparatus for the molding of resin using a plaster mold.

As the resin is pressurized and charged abruptly or at high speed from an injection opening into a mold, the air in the mold is compressed and the internal pressure of the mold becomes momentarily high, thus the resistance within the mold becomes high. This momentary abrupt increase in the pressure in the mold lowers the speed of the resin about to be charged into mold at a high speed (less than one second), thus inducing the cooling of the resin. However, in an injection mold, the time in which the resin is cooled is inversely proportionally to the distance traversed by the resin and the thinness of the resin product; the charging operation must be completed before the resin is cooled and hardened. Application of excessive pressure to the mold in disregard of the above leads to an increased pressure remaining in the mold and lowers the physical properties and stability of the resin. Moreover, molding may become impossible if the product has both thick and thin portions.

Furthermore, even if an abrupt pressure increase in the mold during injection molding can be avoided by a suitable air vent, the vent will be blocked quickly by hardened resin and the resin already charged into the mold will start to harden and will shrink.

Moreover, if the molded product has considerable thickness, its dimensional stability cannot be maintained unless a holding pressure is applied immediately, because the resin once charged into the mold is subjected to cooling and shrinkage. The problem is then how to control this and how to cope with the situation that, while decreased pressure due to shrinkage may be compensated by addition of resin, there is no way to charge additional resin if the sprue runner has already been stopped completely through hardening before the molded article has assumed a completely stable condition.

It is of no avail to consider only the shrinkage caused during molding, and charging into the mold must be completed before hardening of the resin. To this end, injection and charging must occur in a very short time by using an elevated injection speed. However, as the air at the thick portion is forced into the thin portion, the air resistance afforded by the thin portion will be further increased, thereby further delaying the resin flow during charging and reducing the injection charging effect. Thus, a shorter article may be produced, or the desired physical properties and accuracy may not be obtained. On the other hand, increasing the injection speed and pressure recklessly leads to unstable quality and to the destruction of the plaster mold. In such a case, the technical problem to be solved is that the correlation between the air vent and the diameter and length of the sprue runner must be taken into consideration, so as to cause the air vent to be sealed by the hardening resin once the air in the mold has been completely discharged, while still allowing additional resin to be injected into the mold to supplement and stabilize the hardening resin against contraction or shrinking.

It is therefore a first object of the invention to provide a method and an apparatus in which the invention to provide a method and an apparatus in which the optimum correlation between the injection speed and pressure and the air vent diameter can be obtained.

It is a second object of the invention to provide a method and an apparatus for obtaining the proper correlation between the air vent and the sprue runner and the mold holding pressure.

It is a third object of the invention to provide a method and an apparatus for preventing the premature hardening of the resin in the sprue runner.

It is a fourth object of the invention to provide a method and an apparatus for improving the physical properties and stability of a molded product which has both the thick and thin portions.

It is a fifth object of the present invention to provide a plaster mold cavity such that the shape of the pattern to be embedded in the plaster mold maintained faithfully.

These and other related and similar objects may be briefly summarized as follows: a wax pattern, including appropriately dimensioned sprue runner, gate and air vent portions, is used to fabricate a plaster mold free from any air bubbles or other similar defects. The plaster mold is contained within a metal flask provided with a pressure sensor at the sprue gate. The air within the mold is vented out by an air vent having a diameter related to the sprue runner and gate diameters and lengths and to the desired charging pressure. The resin pressure inside the sprue is continually monitored by the pressure sensor to determine when the resin has filled the entire mold cavity, and when it has cooled and solidified. In addition, a maximum setting pressure within the maximum allowable range of the pressure in the mold may be specified; however, if the injection speed is very fast, it is possible to permit the pressure in the mold to exceed the pressure limits normally associated with a plaster mold for a fraction of a second to ensure that the mold has been fully charged. An automatic controller is used to control the hydraulic system of the molding machine so that the desired pressure is maintained until sealing of the mold gate. The controller also monitors the actual time required for the initial injection of resin and compares it to the desired injection speed; the controller may also monitor the holding portion of the injection cycle to determine the time required for the resin in the sprue runner to harden, and compare the measured holding time to a desired setting time specified by the operator. In order to ensure that the resin in the sprue portion of the mold does not prematurely harden and block the introduction of additional resin into the mold to compensate for resin shrinkage in any thick portions of the mold which are still setting, heating pipes may be embedded in the plaster adjacent the sprue runner portion and cooling pipes may be embedded in the plaster adjacent the thick portions of the mold cavity, to accelerate the hardening of the resin in the thick portion relative to that in the sprue runner portion.

DETAILED DESCRIPTION OF THE INVENTION

Figure 1:
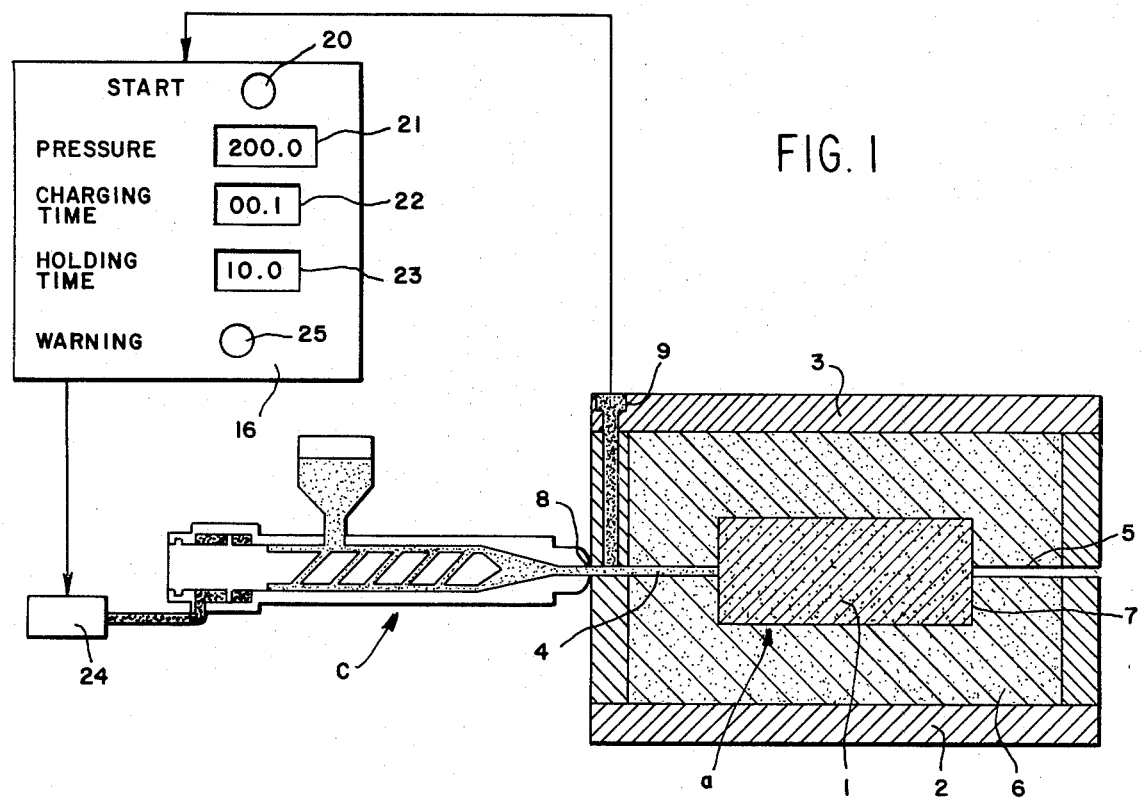
FIG. 1 is a longitudinal section of a mold according to the present invention showing the molding of a molded product having a uniform thickness.

FIG. 1 depicts a molding process according to the present invention wherein a resin product (a) to be molded in a mold cavity 1, has approximately a constant thickness.

A plaster mold 6 is contained within a lower metal flask 2 and an upper metal flask 3. A sprue runner 4 and an air vent 5 extend in opposing directions respectively to corresponding openings provided at the joint surfaces of the upper and lower flasks 2 and 3.

Plaster 6 may be injected into the assembled flasks 2 and 3, and air bubbles are removed from the plaster by vacuum defoaming. After the plaster has been hardened, wax is removed therefrom by heating to provide a plaster mold cavity corresponding to the molded article 7.

In the vicinity of an injection opening 8 which leads to sprue runner 4, there is provided in the wall of the flask a sensor pin 9 of an internal pressure sensing and controlling device (b) for sensing the internal pressure. An injection nozzle of a hydraulically operated injection molding machine (c), having a very high speed injection capability (maximum injection speed less than 0.1 second) is applied to the opening 8 for pressure injection of ultra-hard resin into the plaster mold 7 at a pre-set minimum injection speed of 0.01 to 10 seconds and at a pre-set maximum injection pressure of 30 to 1200 kg/cm$^2$. The air held in the mold 7 is thereby compressed, resulting in a momentary increase in internal pressure prevailing in the mold. This pressure is relieved smoothly by air vent 5, thereby preventing an abrupt increase in the internal pressure. After the air has been completely evacuated, the air vent 5 is sealed hermetically by the resin. Taking the thickness of the molded product and other conditions into account, the dimensional range of the diameter for the air vent 5 should be 0.1 to 5 mm and preferably from 0.5 to 2.0 mm; for the sprue runner 4 (and sub-runners, if any) it should be from 0.5 to 20 mm and preferably from 2.0 to 7.0 mm. Once any abrupt increase in the pressure prevailing within the mold has been avoided by the air exiting through the air vent 5, the latter may then be sealed by the resin hardening therein, and the initial charging phase of the process has been completed. This may be readily determined by the controller, which initiates the start of the injection cycle upon operation of a start button 20 and which then checks whether the pressure at sensing pin 9 reaches the desired injection pressure (input by means of first digital control switch 21) within the desired injection time interval (input by means of second digital control switch 22). If the controller determines that if the desired initial charging conditions have not been met, a warning may be given to the operator, for example by means of a warning light 23.

For most dental applications, an injection speed of from 0.01 to 2.0, and preferably 0.1 to 0.2 seconds, is utilized, with a pressure of from 150 to 400 kg/cm$^2$ (the higher pressures being used for longer articles and/or articles having thin portions).

The injected resin starts to harden and to shrink immediately following initial injection. Therefore, a holding pressure must be maintained for some period of time while the resin sets, in order that additional resin may be injected into the mold to compensate for such shrinkage. The desired setting time may be input by means of third digital switch 23. If the controller is in a semi-automatic mode, it attempts to maintain the pressure for the duration of the pre-determined setting time. A fully automatic mode is also possible, wherein the controller will sense a slight drop (perhaps 10%) in the pressure measured by sensing means 9, signifying that the resin in the sprue runner has hardened and is itself shrinking slightly and that accordingly no more resin can be injected into the mold. If such a hardening is detected prior to the expiration of the established setting time, the controller can give an appropriate warning to the operator.

Depending on the size and shape of the article, the setting time may be from 0.05 to 60 seconds and preferably from 15–20 seconds. During this time, the air vent 5, used for initially relieving the pressure within the mold, must remain completely sealed.

Figure 10:
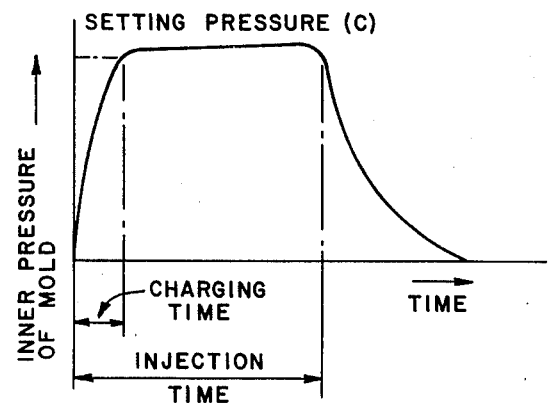
FIG. 10 is an ideal characteristic curve of the inner pressure of a mold to be controlled according to the present invention.

It may be noted that, in the above construction, a variable hydraulic pressure supply device, such as a servo valve or a proportional magnetic valve 24, may be mounted to the injection means for effecting a closed feedback loop for the resin pressure within the mold so that the inner pressure in the mold for each shot (until the sprue runner 4 is sealed) may be controlled in such a manner that the inner pressure in the mold is within a predetermined tolerance (say, ±10%) of the pre-set setting pressure, as indicated in FIG. 10.

In the embodiment of FIG. 1, the molded product was assumed to have a uniform thickness; the molding operation was thus assumed to be relatively simple and not involving any considerable difficulties. However, in the case of a molded product having a considerable thickness, the higher the temperature at which the resin is heated, the more shrinkage the product undergoes when the latter is held and cooled in the mold. As one possible countermeasure to such shrinkage, the mold pressure sensing and control device is set to the maximum pressure above which the plaster mold will be destroyed, so that a larger amount of resin can be supplied to the mold during the setting process to compensate for the greater resin shrinkage. It is to be noted that, if the sprue runner 4 has been completely solidified before the injected resin has been molded completely and stabilized, the control function of the sensor pin 9 may be lost. Thus, the optimum correlation between the diameter and length of the sprue runner 4 relative to the thickness of the molded product is also very important to the objective of preventing the premature solidification of the sprue runner 4.

Figure 9:
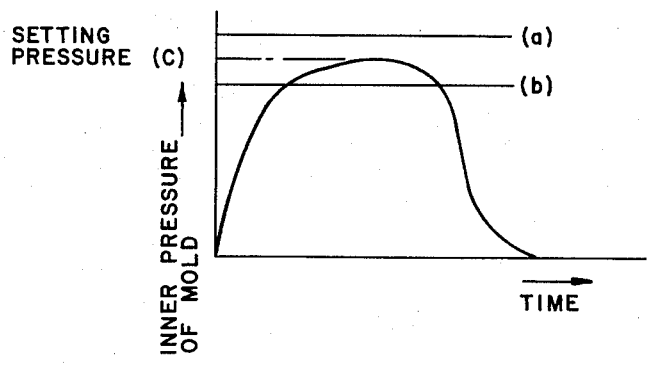
FIG. 9 is a characteristic curve of the setting pressure within a mold to be controlled.

The desired pressure within the mold of the molding machine may be determined experimentally in the following manner. A pressure transducer or sensing means for sensing the resin pressure is mounted near the cavity gate or near the sprue runner 4 as described before. The resin pressure is measured, with the aid of an oscillograph or other recorder (not shown), from the time that molten resin is injected from the nozzle of the molding machine into the mold until the resin has been completely filled into the cavity 1 and solidified through cooling. Thus, a desired setting pressure (c) and the corresponding time intervals for a typical mold type may be found experimentally, said setting pressure being within a tolerance range included within the upper and lower limits (a) and (b) short of insufficient charging and overcharging, as indicated in FIG. 9.

Figure 2:
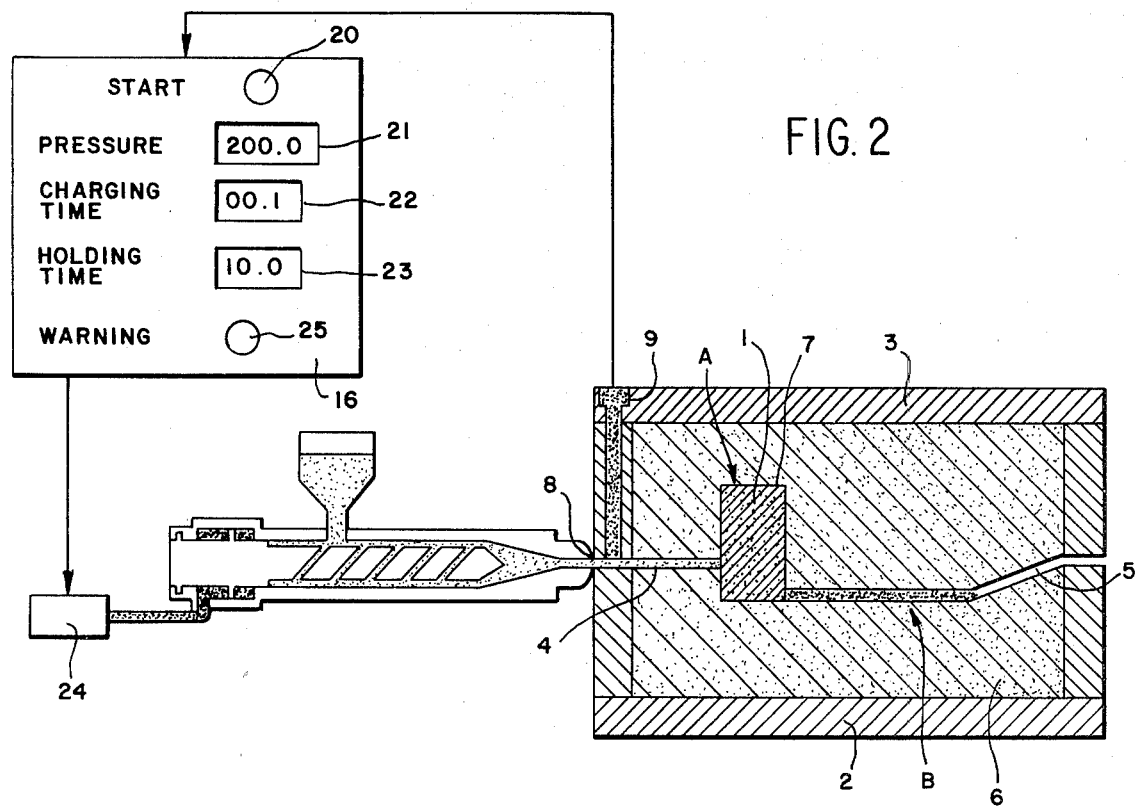
FIG. 2 is a longitudinal section of a mold according to the present invention showing the process of integral molding of a molded product having a thick portion A and a thin portion B.
Figure 3:
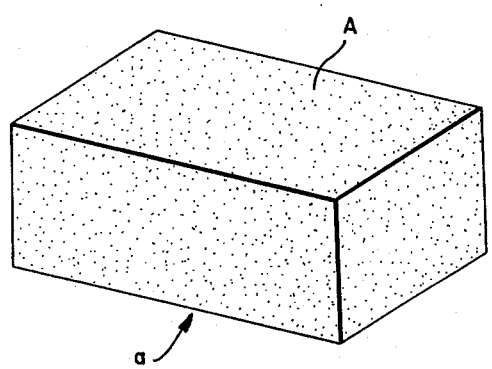
FIGS. 3 through 5 are perspective views of molded products.

FIG. 2 shows an embodiment of the present invention wherein the molded product has a non-uniform thickness and thus has a thick portion (A) and a thin portion (B) which must be molded simultaneously.

In this case, it is of no avail to take solely the shrinkage into consideration during molding; the hardening of the resin should not occur until the resin has been completely injected into mold. Thus, an increased injection speed is required in comparison with that used in the embodiment of FIG. 1. First of all, if the air in the thick portion A is compressed and held in the thin portion B, the air pressure thereof becomes large and delays the resin flow during the injection molding to cool the injected resin, thus resulting in a lowered injection effect and worsening physical properties of the molded product. An elevation in injection pressure and hence in injection speed may overcome the resistance in the mold. However, the plaster mold may be destroyed. The air vent 5 is essential for minimizing such increase in pressure in the mold. In addition, the air vent 5 should be of such a diameter and length as to be sealed by the injected resin itself after realization of the above effect.

The diameters of sprue runner 4 and the air vent 5 will vary in accordance with the size of the products to be molded, but in order to limit the discharge pressure and retain the suitable properties of the material by supplementing the resin during shrinkage, a proper correlation between the sprue runner 4 and the air vent 5 is required, so as to enable the resin capable of sealing the air vent to harden and thereby prevent the secondary pressure from discharging.

The required physical properties and dimensional accuracy may nevertheless be realized in a molded product having both thick and thin portions by utilizing a control device capable of maintaining optimum injection molding conditions in accordance with pre-set pressures and times appropriate to the particular molding operation. The best plaster materials are able to withstand a momentary pressure of 700–800 kg/cm$^2$. Accordingly, especially when an article having a very thin portion (which will harden almost instantaneously) is to be molded, it is possible to utilize a fast injection speed that will result in a momentary burst of pressure well above 400 kg/cm$^2$ towards the end of the charging portion of the injection cycle, before the controller is able to bring the pressure down to the desired setting pressure.

Figure 4:
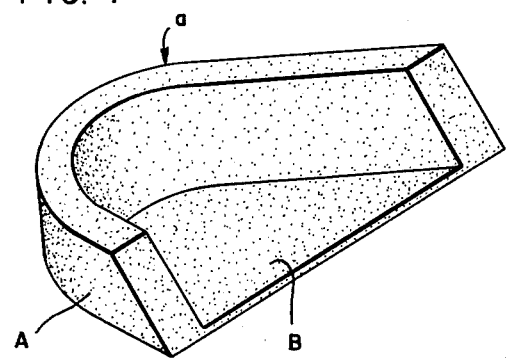
Figure 5:
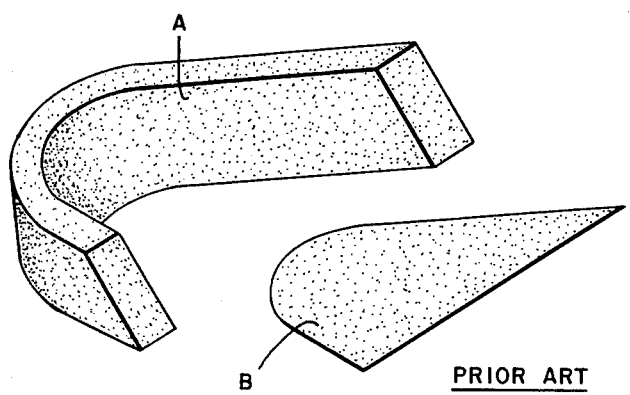

In injection molding not only of industrial products, but of dental prosthetic goods, where not many products are required and the injection molding is to be made in a plaster mold secured by a metal flask, in accordance with the present invention the internal pressure in the mold is sensed and adjusted by a pressure sensor pin 9 and a control device b. By such means, a product having a thin portion B with a thickness of 0.5 mm (only one-third that of the prior art!) and a thick portion A having a thickness of 20 mm, which prior to the present invention had to be molded separately and connected to one another after molding (FIG. 5), can now be molded integrally and simultaneously, as shown in FIG. 4, through controlled injection molding at an ultra-high speed and without the risk of destruction of the plaster mold.

However, when the time has come for sprue runner 4 to harden, the thick portion of the filled mold may still undergo cooling and shrinkage; because of the fact that the thick portion is too thick, the desired properties and accuracy may not be obtainable. Thus, as shown in FIG. 6, a cooling pipe 10 may be embedded in advance at the periphery of the thick portion A, while a heating pipe 11 is embedded in the vicinity of the thin portion B, through which is caused to flow respectively a cold and a hot fluid, thereby effecting a differential cooling effect so as to improve the overall physical properties and accuracy of the molded product.

Moreover, when manufacturing the plaster mold, the mixing of the plaster with water and the stirring of the resulting mixture are carried out in the conventional manner; however, preferably the injection of the plaster into the flash is carried out in vacuum prior to its setting up and at the same time vibration is applied, which results in an accurate inner surface of the plaster pattern, free from bubbles and other defects, thus further improving the accuracy of the molded product.

Figure 6:
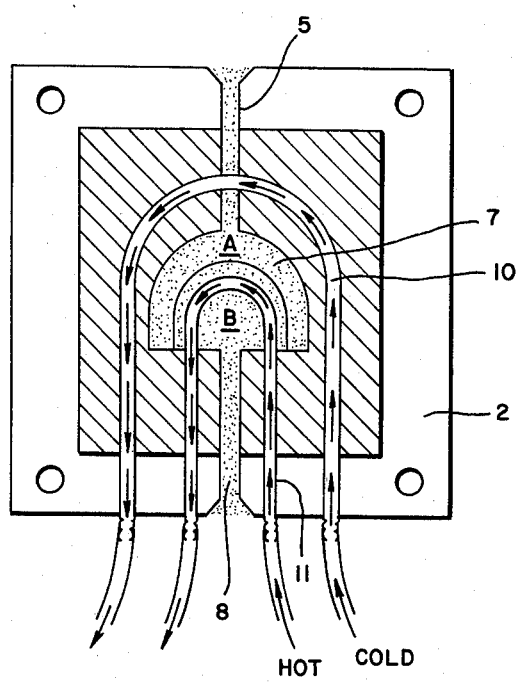
FIG. 6 is a plan section showing the inside of the flask provided with cooling and heating means.
Figure 7:
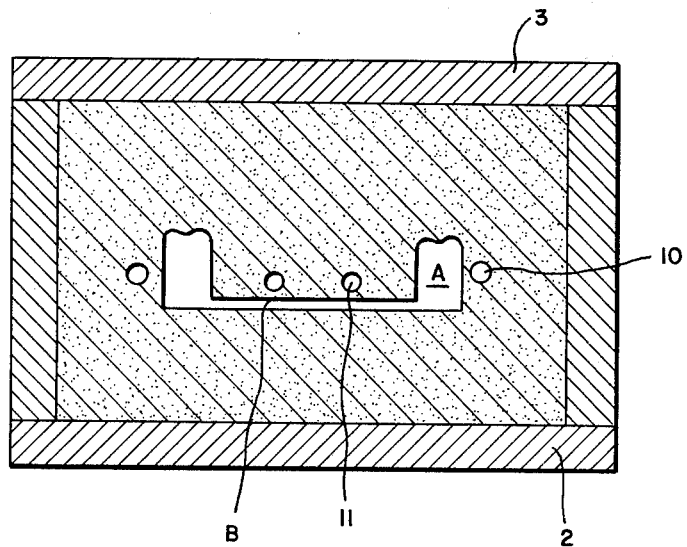
FIG. 7 is a longitudinal section of another mold according to the present invention showing the dental prosthetic goods having a thin palatal surface.
Figure 8:
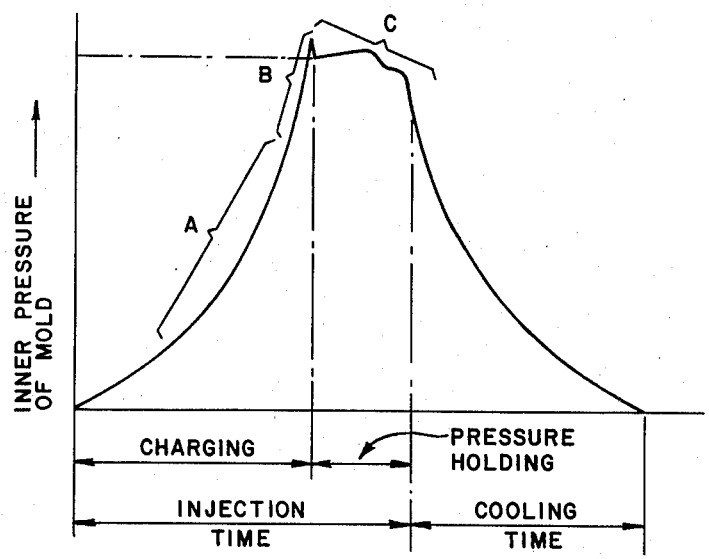
FIG. 8 is a characteristic curve of the inner pressure of a mold and the time elapsed according to the prior art.

FIG. 7 shows a cross-sectional view of the mold of FIG. 6 as used to mold dental prosthetic goods, (such as artificial teeth) in accordance with the teachings of the present invention. Unless the thickness of the portion of the molded product corresponding to the upper palatal surface 12 of the mouth is less than 0.5 mm, it is normal from the human physiology point of view for the subject to gag on such an alien or foreign substance entering his mouth, so as to defend and protest his body. Accordingly, the portion must be very thin. In this respect, the artificial teeth heretofore obtained by the conventional methods, however, were often broken at such a thin portion because the latter could not effectively resist the chewing pressure; thus, artificial teeth with thin portions of sufficient strength could not be realized. Recently, a resin with satisfactory properties in this connection has been developed. However, such resin has to be heated from 280° to 400° C. or higher and exhibits bad fluidity during injection charging. Accordingly, in such resin, the desired physical properties and dimensional accuracy cannot be attained unless the injection charging is completed at the injection speed of about 0.1 second. Moreover, the product according to the conventional technique has a property of absorbing water and in turn it has flexion so that its accuracy is not good. In the conventional injection molding process, it was not possible to manufacture artificial teeth with the physiologically ideal thin portions of less than 0.5 mm as shown in FIG. 7, by using modern resins such as polycarbonate, polyallylate or polysulfonic resin and injecting them into a plaster mold, despite the desireability of so doing in view of the improvements of quality of product as well from a human physiological point of view. The injection molding of improved dental prosthetic goods using plaster molds has been accordingly provided by the provision, in accordance with the present invention of molding apparatus with a very high injection speed which comprises a sensor pin 9 and a means for sensing and controlling the inner pressure of the mold and with cooling (10) and heating (11) means for a plaster mold operated in accordance with the optimal molding conditions and the proper relationship between the dimensions of the sprue runner 4 and the air vent 5.

I claim:

1. A method for producing one-of-a-kind molded resin articles having both a thick portion and thin portion to be molded simultaneously comprising the steps of:
(a) forming a plaster mold inside a metal jacket, said mold including a sprue runner passageway an external pressure injection opening in said jacket to a portion of an interior plaster mold cavity corresponding to said thick portion and an air vent passageway from the exterior of said jacket to a portion of said interior plaster mold said interior plaster mold cavity corresponding to said thin portion, said sprue runner having a diameter dimensions of 0.5 to 20 mm and said air vent having corresponding diameter of 0.1 to 5.0 mm, and the diameter of said air vent being substantially smaller than the diameter of said sprue runner, whereby resin injected into said mold will completely harden within said air vent prior to the hardening of said injected resin in said sprue runner and in said mold cavity thick portion connected thereto;
(b) providing pressure sensor means in said metal jacket for sensing the internal pressure of the molten resin within said runner passageway;
(c) establishing a predetermined maximum operating pressure of from 30-1200 kg/cm for injecting molten resin into said plaster mold, said predetermined maximum operating pressure momentarily exceeding a pressure limit of said plaster mold;
(d) establishing a predetermined maximum charging time of less than 1 second for injecting said molten resin inside said plaster mold;
(e) establishing a predetermined setting time of less than 60 seconds but of sufficient duration to permit said resin in said sprue runner to completely harden and prevent any further resin to be injected into said mold;
(f) plasticizing the molding resin by a combination of mechanical shearing and heat;
(g) injecting the plasticized resin into said plaster mold by means of said injection opening at a high injection speed of about 0.01-2.0 seconds, while monitoring the internal resin pressure sensed by said sensing means to determine whether said air vent, said mold cavity and said sprue runner have been filled with molten resin and the resin in said air vent has begun to harden within said established maximum charging time;
(h) accelerating the hardening of the injected molten resin within said mold cavity thick portion relative to that with said sprue runner passageway sufficiently to harden said resin in said thick portion before said resin hardens in said sprue runner passageway; and
(i) once said mold cavity has been so sealed by hardening of resin in said vent, maintaining the internal resin pressure as measured by said sensing means at said maximum operating pressure for said predetermined setting time.

2. The method of claim 1, wherein said accelerating step (h) is accomplished by making said sprue runner passageway larger than said mold cavity thick portion.

3. The method of claim 2, wherein said accelerating step (h) is accomplished by using (1) an enlarged sprue runner passageway, (2) localized cooling of the molten resin within said mold cavity thick portion and (3) localized heating of the molten resin within said sprue runner passageway.

4. The method of claim 1, further comprising the step of:
(j) automatically warning a machine operator if said maximum operating pressure has not been reached within said maximum charging time.

5. The method of claim 1 or 4 further comprising the step of:
(k) automatically informing an operator if said maximum setting pressure is still exerted upon said operating sending means upon the expiration of said predetermined setting time.

6. The method of claim 1, wherein said accelerating step (h) is accomplished by maintaining said mold in a first region adjacent said mold cavity thick portion at a cooler temperature than that of a second region of said mold surrounding said sprue runner passageway.

7. The method of claim 6, wherein the desired temperature difference is maintained by providing a flow of liquid coolant through a cooling passage provided in said first region.

8. The method of claim 7, wherein said required temperature difference is further accomplished by means of localized heating of said second region.

* * * * *